US012697896B2

(12) United States Patent (10) Patent No.: US 12,697,896 B2
Dowling (45) Date of Patent: Aug. 4, 2026

(54) UNDERGROUND MINE ENERGY MANAGEMENT SYSTEM

(71) Applicant: Caterpillar Inc., Peoria, IL (US)

(72) Inventor: Alexander Eli Dowling, Mount Hicks (AU)

(73) Assignee: Caterpillar Inc., Peoria, IL (US)

( * ) Notice: Subject to any disclaimer, the term of this patent is extended or adjusted under 35 U.S.C. 154(b) by 434 days.

(21) Appl. No.: 18/239,194

(22) Filed: Aug. 29, 2023

(65) Prior Publication Data

US 2024/0067038 A1 Feb. 29, 2024

(30) Foreign Application Priority Data

Aug. 30, 2022 (AU) ................................. 2022224736

(51) Int. Cl.
*E21F 17/06* (2006.01)
*B60L 53/62* (2019.01)
(Continued)

(52) U.S. Cl.
CPC .............. *B60L 53/68* (2019.02); *B60L 53/62* (2019.02); *B60L 53/665* (2019.02); *B60L 53/67* (2019.02);
(Continued)

(58) Field of Classification Search
CPC ........ E21F 17/06; E21C 35/302; B60L 53/62; B60L 53/66; B60L 53/665; B60L 53/67;
(Continued)

(56) References Cited

U.S. PATENT DOCUMENTS 8,866,618 B2 * 10/2014 Cotten ................... G01C 23/00
340/539.22
9,722,442 B2 * 8/2017 Berry ..................... E21F 17/06
(Continued)

FOREIGN PATENT DOCUMENTS

EP 3808513 4/2021
WO 2019212116 A1 11/2019
WO 2021072764 A1 4/2021

OTHER PUBLICATIONS

European Extended Search Report for Europe Patent Appln. No. 23190800.5, mailed Feb. 29, 2024 (13 pgs).

*Primary Examiner* — Alvin H Tan

(57) ABSTRACT

An underground mine energy management system includes wireless nodes located at different 3D coordinate positions along travel paths throughout an underground mine, and energy zones are defined between respective pairs of the wireless nodes. A controller is programmed to communicate with a central control office for the mine, a plurality of electric mining vehicles, a plurality of energy storage devices, and a plurality of charging stations operating within the mine, receive data indicative of an energy utilization profile for each of the electric mining vehicles traversing each of the energy zones in one of a loaded or unloaded condition, and an energy storage profile for each of the energy storage devices available to be installed on an associated electric mining vehicle traversing each of the energy zones, determine productivity goals, missions, and prioritized tasks to be performed by each of the electric mining vehicles and each of the energy storage devices, pair each electric mining vehicle with at least one energy storage device based on a determined mission or prioritized task, and generate travel paths made up of a sequence of the energy zones for the paired electric mining vehicles and (Continued)

energy storage devices to complete the determined mission or prioritized task.

20 Claims, 7 Drawing Sheets

(51) Int. Cl.

| | |
|---|---|
| *B60L 53/66* | (2019.01) |
| *B60L 53/67* | (2019.01) |
| *B60L 53/68* | (2019.01) |
| *E21C 35/00* | (2006.01) |
| *G01C 21/34* | (2006.01) |
| *G05D 1/00* | (2006.01) |
| *B60L 5/18* | (2006.01) |
| *B60L 5/38* | (2006.01) |

(52) U.S. Cl.

CPC ............ *E21C 35/302* (2023.05); *E21F 17/06* (2013.01); *G01C 21/3469* (2013.01); *G05D 1/0225* (2013.01); *B60L 5/18* (2013.01); *B60L 5/38* (2013.01); *B60L 2200/40* (2013.01)

(58) Field of Classification Search

CPC .......... B60L 53/68; B60L 58/10; B60L 58/16; B60L 1/00; G01C 21/3469; G05D 1/0225

See application file for complete search history.

(56) References Cited

U.S. PATENT DOCUMENTS

| | | | | |
|---|---|---|---|---|
| 9,776,326 | B2 * | 10/2017 | Zevenbergen | ......... B25J 9/1664 |
| 9,827,865 | B2 * | 11/2017 | Zhou | ................... H01M 50/251 |
| 10,240,322 | B2 | 3/2019 | Miller et al. | |
| 10,647,218 | B1 * | 5/2020 | Huang | ................. H01M 10/44 |
| 11,207,995 | B2 | 12/2021 | Marsolek | |
| 11,867,063 | B2 * | 1/2024 | Lewis | ................... G06Q 50/06 |
| 2006/0273756 | A1 * | 12/2006 | Bowling | ................ B60L 53/68 |
| | | | | 320/107 |
| 2016/0247106 | A1 | 8/2016 | Dalloro et al. | |
| 2019/0263269 | A1 | 8/2019 | Huff et al. | |
| 2020/0319640 | A1 | 10/2020 | Vogel et al. | |
| 2021/0200240 | A1 | 7/2021 | Ware et al. | |
| 2021/0201230 | A1 | 7/2021 | Duffy et al. | |
| 2021/0397765 | A1 | 12/2021 | Shimamura | |
| 2023/0011148 | A1 * | 1/2023 | Jeong | ..................... B60L 58/16 |

* cited by examiner

ENERGY CHARGER MATRIX

| CHARGER ID | CONNECTED | DISCHARGE LIMIT |
|---|---|---|
| C1 | TRUE | 700amp |
| C2 | FALSE | 500amp |
| C3 | FALSE | 500amp |
| C4 | FALSE | 700amp |
| ... | ... | ... |

VEHICLE AND ENERGY USAGE PER ZONE DATABASE

| MACHINE ID | Z1-Z2 UNLOADED kW.hr | Z2-Z1 LOADED kW.hr | Z2-Z3 UNLOADED kW.hr | Zn-Zn-1 ......... |
|---|---|---|---|---|
| TR1 | 3 | 6 | 4 | |
| TR2 | 3.3 | 6.6 | 5 | |
| LD1 | 1 | 2 | 1.5 | |
| LD2 | 1.2 | 2.4 | 3 | |

BATTERY DATABASE

| BATTERY ID | SOC | SOH | AVAILABLE kW.hr | CELL TEMP | CHEMISTRY | BALANCING |
|---|---|---|---|---|---|---|
| B1 | 86% | 90% | 225 | 32°C | LFP | NO |
| B2 | 60% | 86% | 148 | 39°C | NMC | NO |
| B3 | 95% | 82% | 224 | 25°C | LFP | YES |
| B4 | 70% | 95% | 191 | 27°C | LFP | NO |

200

100

| ASSET | MISSION 1 | MISSION 2 | MISSION 3 | MISSION 4 | MISSION 5 |
|---|---|---|---|---|---|
| TR1 | L1 | L1 | L10 | C1 | |
| TR2 | L1 | L10 | L1 | C1 | |
| TR3 | L10 | L10 | L9 | L9 | L1 |
| TR4 | L9 | L10 | L2 | L2 | C3 |

FIG. 6

PRODUCTION PLAN EXAMPLE

| PRIORITY | PULL POINT | POINT TYPE | TONNES LEFT | LOADS REMAINING LOADER | LOADS REMAINING TRUCK | MAX TRUCKS ASSIGNED | LOADER ASSIGNED | ENVIRONMENT TEMP DEG C |
|---|---|---|---|---|---|---|---|---|
| 2 | L1 | PRODUCTION | 1200 | 72 | 24 | 3 | YES | 46 |
| 3 | L3 | PRODUCTION | 1000 | 60 | 20 | 3 | NO | 40 |
| 1 | L2 | DEVELOPMENT | 800 | 48 | 16 | 2 | YES | 50 |
| ... | ... | | ... | ... | ... | | | |
| 5 | L15 | PRODUCTION | 2000 | 120 | 40 | 3 | YES | 41 |

FIG. 7

UNDERGROUND MINE ENERGY MANAGEMENT SYSTEM

CROSS-REFERENCE TO RELATED APPLICATION

This application claims priority under 35 USC § 119 and the Paris Convention to Austrailian patent application No. 2022224736 filed on Aug. 30, 2022.

TECHNICAL FIELD

The present disclosure relates generally to an underground mine energy management system and method, and more particularly to an underground mine energy management system and method that establishes energy zones in the mine and energy profiles for electric mining vehicles, energy storage devices, and charging stations in the mine.

BACKGROUND

Construction, mining, waste management, manufacturing, and assembly worksites employ a variety of work machines and equipment that require power to operate. Common work machines include, for example, excavators, loaders, dozers, motor graders, haul trucks, and other types of heavy equipment used to perform tasks. Worksite equipment includes work machine support equipment, lighting, conveyors, and other equipment assisting worksite task performance. Many of these utilize electrical energy that can be powered using removable and interchangeable energy storage devices, including batteries and capacitors. Hybrid and fully electric work machines in particular may employ one or more energy storage devices powering the work machine and/or its accessories.

Emissions and energy dependence are ongoing problems at any worksite, including mines, quarries, and suburban work sites. Current technologies used to perform work and maintain a worksite use significant resources and emit emissions into the atmosphere. Future work machines and worksite systems may employ hybrid and fully electric machines, and future worksites may leverage renewable energy power sources in order to be self-sustaining. However, managing the power demands of each work machine in the worksite and of the worksite generally, while controlling the energy generated by a renewable energy power source, requires a comprehensive energy management system and method.

One energy management system and method is described in U.S. Patent Publication No. 2016/0247106 (the '106 publication) to Dalloro et al., published on Aug. 8, 2016. The '106 publication describes a computer-implemented method for managing a fleet of electric vehicles in order to optimize the use of such vehicles for transportation and energy storage purposes. The electric vehicles of the '106 publication are autonomous and selectively guided to parking lots to be charged. The battery packs of the vehicles provide energy storage for an electric grid while not being used for transportation purposes.

Although the system of the '106 publication may solve a particular need, it does not provide an energy management system and method that is suitable for managing the energy requirements of an underground mine operating exclusively with fully electric vehicles and interchangeable energy storage devices.

The disclosed system and method is directed to overcoming the one or more problems set forth above along with other problems associated with prior art energy management systems.

SUMMARY

In one aspect, the present disclosure is directed to an underground mine energy management system. The energy management system may include one or more electric mining vehicles, one or more energy storage devices, and one or more charging stations configured for charging the energy storage devices. Each of the one or more energy storage devices is configured to be universally and interchangeably installed on and removed from an associated electric mining vehicle and one or more of charged at one of the one or more charging stations or installed on a different electric mining vehicle. A plurality of wireless nodes may be located at different 3D coordinate positions along travel paths throughout an underground mine, wherein energy zones are defined between respective pairs of the plurality of wireless nodes. One or more controllers may be communicatively coupled with a central control office and each of the electric mining vehicles, the energy storage devices, and the charging stations. The one or more controllers may be programmed to receive data indicative of an energy utilization profile for each of the electric mining vehicles traversing each of the energy zones based on a respective energy utilization efficiency of each respective electric mining vehicle as it travels in one of a loaded or unloaded condition along the energy zone. The one or more controllers may also be programmed to receive data indicative of an energy storage profile for each of the energy storage devices available to be installed on an associated electric mining vehicle traversing each of the energy zones based on sensed battery characteristic data including one or more of a State of Charge (SOC), State of Health (SOH), number of charge cycles, or cell temperatures for the energy storage device. The one or more controllers may be programmed to determine missions and prioritized tasks to be performed by each of the electric mining vehicles and each of the energy storage devices separately from the electric mining vehicles during a predetermined period of time, pair each electric mining vehicle with at least one energy storage device based on a determined mission or prioritized task, the energy utilization profile for the electric mining vehicle, and the energy storage profile for the at least one energy storage device, and generate travel paths made up of a sequence of the energy zones for the paired electric mining vehicles and energy storage devices to complete the determined mission or prioritized task.

In another aspect, the present disclosure is directed to a controller for an underground mine energy management system that includes a plurality of wireless nodes located at different 3D coordinate positions along travel paths throughout an underground mine, wherein energy zones are defined between respective pairs of the plurality of wireless nodes. The controller may be programmed to communicate with a central control office for the mine and each of a plurality of electric mining vehicles, a plurality of energy storage devices configured to be universally and interchangeably installed on and removed from an associated electric mining vehicle, and a plurality of charging stations, all operating within the underground mine. The energy storage devices may be configured to be one or more of charged at one of the charging stations or installed on a different electric mining vehicle, depending on mine productivity goals or specific missions or prioritized tasks to be performed in the underground mine. The controller may be further programmed to receive data indicative of an energy utilization profile for each of the electric mining vehicles traversing each of the energy zones based on a respective energy utilization efficiency of each respective electric mining vehicle as it travels in one of a loaded or unloaded condition along the energy zone, receive data indicative of an energy storage profile for each of the energy storage devices available to be installed on an associated electric mining vehicle traversing each of the energy zones based on sensed battery characteristic data including one or more of a State of Charge (SOC), State of Health (SOH), number of charge cycles, or cell temperatures for the energy storage device, determine missions and prioritized tasks to be performed by each of the electric mining vehicles and each of the energy storage devices separately from the electric mining vehicles during the predetermined period of time, pair each electric mining vehicle with at least one energy storage device based on a determined mission or prioritized task, the energy utilization profile for the electric mining vehicle, and the energy storage profile for the at least one energy storage device, and generate travel paths made up of a sequence of the energy zones for the paired electric mining vehicles and energy storage devices to complete the determined mission or prioritized task.

In yet another aspect, the present disclosure is directed to a method of managing energy consumption in an underground mine that includes a plurality of wireless nodes located at different 3D coordinate positions along travel paths throughout the underground mine, wherein energy zones are defined between respective pairs of the plurality of wireless nodes. The method may include communicating, using one or more controllers, with a central control office for the mine and each of a plurality of electric mining vehicles, a plurality of energy storage devices configured to be universally and interchangeably installed on and removed from an associated electric mining vehicle, and a plurality of charging stations, all operating within the underground mine, wherein the energy storage devices are configured to be one or more of charged at one of the charging stations or installed on a different electric mining vehicle, depending on mine productivity goals or specific missions or prioritized tasks to be performed in the underground mine. The method may further include receiving, by the one or more controllers, data indicative of an energy utilization profile for each of the electric mining vehicles traversing each of the energy zones based on a respective energy utilization efficiency of each respective electric mining vehicle as it travels in one of a loaded or unloaded condition along the energy zone, receiving, by the one or more controllers, data indicative of an energy storage profile for each of the energy storage devices available to be installed on an associated electric mining vehicle traversing each of the energy zones based on sensed battery characteristic data including one or more of a State of Charge (SOC), State of Health (SOH), number of charge cycles, or cell temperatures for the energy storage device, determining, using the one or more controllers, missions and prioritized tasks to be performed by each of the electric mining vehicles and each of the energy storage devices separately from the electric mining vehicles during a predetermined period of time, pairing, using the one or more controllers, each electric mining vehicle with at least one energy storage device based on a determined mission or prioritized task, the energy utilization profile for the electric mining vehicle, and the energy storage profile for the at least one energy storage device, and generating, using the one or more controllers, travel paths made up of a sequence of the energy zones for the paired electric mining vehicles and energy storage devices to complete the determined mission or prioritized task.

BRIEF DESCRIPTION OF THE DRAWINGS

FIG. 6 is a table illustrating an exemplary decision making matrix representative of control logic implemented by a controller according to an embodiment of this disclosure, showing different potential missions that may be run by different electric mining vehicles; and FIG. 7 is a table illustrating an exemplary decision making matrix representative of control logic implemented by a controller according to an embodiment of this disclosure, showing an exemplary production plan.

DETAILED DESCRIPTION

Figure 1:
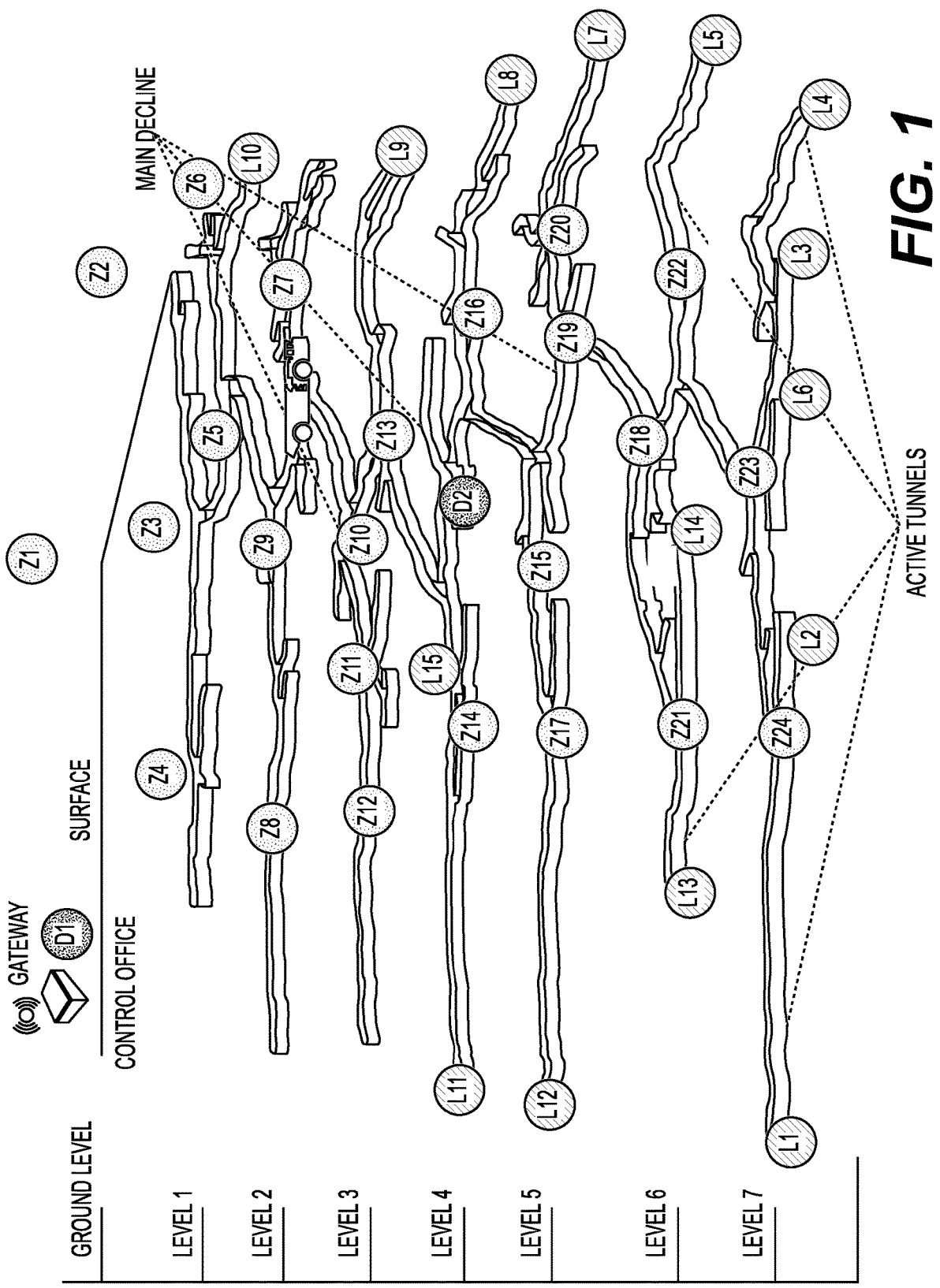
FIGS. 1 and 2 illustrate an exemplary underground mine, including the various interconnected underground levels along which tunnels and pathways are formed to access mined materials at load points, wireless nodes throughout the tunnels, and dump points where mined materials may be deposited.
Figure 2:
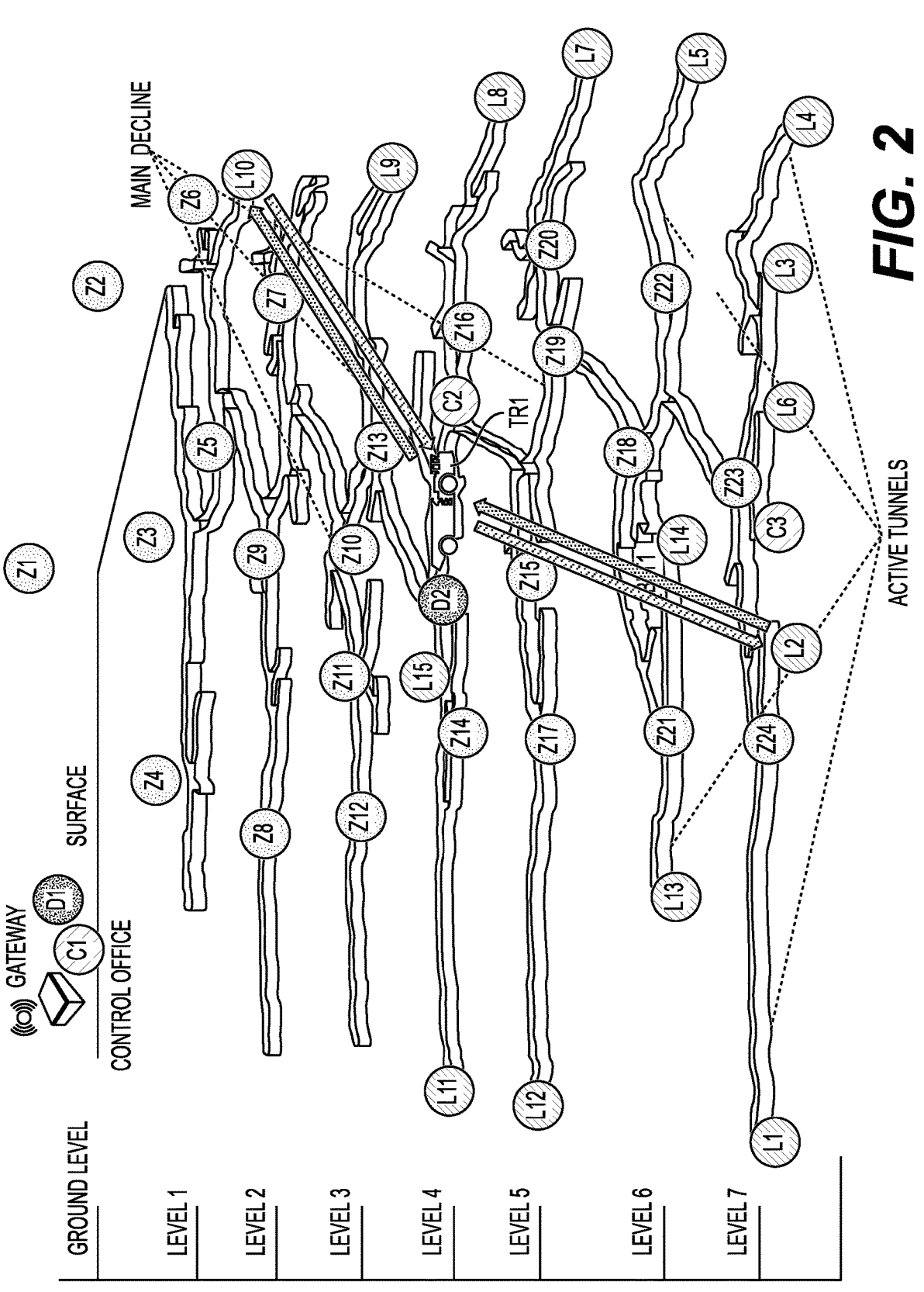

FIGS. 1 and 2 illustrate an exemplary underground mine having underground levels with interconnecting tunnels leading between load points L1-L14 (pull points) at which mined materials may be loaded onto electric mining vehicles configured for transporting the materials, and dump points D1 and D2, and with multiple wireless nodes Z1-Z24 spaced apart along the ceilings or sides of the tunnels at the various underground levels to provide wireless communication between a central control office C1 and a plurality of electric mining vehicles operating throughout the mine, such as TR1 shown in FIG. 2, and interchangeable energy storage devices providing power to different vehicles, such as B3, which is mounted on vehicle TR1 near dump point D2, as shown in FIG. 2. The electric mining vehicles and interchangeable energy storage devices are configured to perform a variety of predetermined tasks in the underground mine, such as drilling, digging, loading, transporting, dumping, or any other type of operation performed by an electric mining vehicle. The wireless communications may be enabled by WiFi, or other alternative means that provide a required range of connectivity.

In various exemplary embodiments of the underground mine site, multiple locations may be designated for particular purposes. For example, the load points L1-L14 may be locations at the ends of mining shafts where drilling machines are drilling and loosening up mined materials, providing roof supports, or placing explosive charges where explosives are employed to remove desired minerals from the earth for other digging machines to dig and load unto vehicles configured for transporting the mined materials to dump points, which may include locations where the mined materials can be crushed or further processed before being moved to the surface. Other locations may serve as areas for the accumulation and temporary storage of energy storage devices that may be transported to those locations by automated support machines such as automated delivery machines before being mounted on an electric mining vehicle. Another location may be designated as a location for one or more charging stations configured to recharge energy storage devices, either alone or mounted on an electric mining vehicle. Additional wireless nodes may be added as additional mine shafts are created, and as existing mine shafts are lengthened, or branches from existing shafts are created.

An exemplary energy management system according to embodiments of this disclosure may include one or more electric mining vehicles, one or more energy storage devices, and one or more charging stations configured for charging the energy storage devices. Each of the one or more energy storage devices may be configured to be universally and interchangeably installed on and removed from an associated electric mining vehicle and one or more of charged at one of the one or more charging stations or installed on a different electric mining vehicle. As work sites such as the underground mine shown in FIGS. 1 and 2 move toward the use of fully electric vehicles, and away from the use of typical combustion based energy machines, work site management may benefit from the implementation of energy management systems that can deal with the finite amounts of battery power that may be available in the mine, and limit peak power demands within the mine while improving run times and productivity of the machines, and maintaining the ability to fulfill prioritized tasks.

A plurality of wireless nodes may be located at different 3D coordinate positions along travel paths throughout an underground mine, and energy zones may be defined between respective pairs of the plurality of wireless nodes. Each energy zone between a pair of wireless nodes may be characterized by a given "potential energy," which may be equivalent to the amount of energy that would be consumed by an electric machine when traversing that particular energy zone, either in a loaded or in an unloaded state. Similarly, each of the energy storage devices may be characterized by a particular battery status such as SOC, SOH, cell temperatures, or number of charge cycles, and the characteristics of the energy storage device may differ depending on which energy zone the energy storage device is located in and how that particular energy storage device came to be in that particular energy zone. In some exemplary implementations of an underground mine energy management system according to this disclosure, charging of energy storage devices onboard a vehicle may even be performed while the vehicle is moving through certain energy zones, for example, when those energy zones are provided with some type of external power source such as a trolley/pantograph-type system including overhead electric power lines, or powered rails over which the vehicle travels. Each of the energy storage devices and charging stations may also be equipped with telematics equipment that enables independent offboard data transmission even when not mounted on or connected to an electric mining vehicle. In some exemplary implementations of this disclosure, an energy storage device transport utility vehicle may be provided separately from the electric mining vehicles on which the energy storage devices are to be mounted for performing particular tasks, and the energy storage device may have been moved to a particular energy zone by such a transport utility vehicle after being fully charged at a charging station. In other implementations, the energy storage device may have been recently removed from another electric mining vehicle because it did not have enough SOC or SOH to complete a desired mission with that vehicle, but may be installed on another electric mining vehicle that may use the remaining amount of energy on that energy storage device to complete a mission. Therefore, when a particular energy storage device is mounted on a particular electric mining vehicle, the combination of the energy storage profile for the energy storage device and the energy utilization profile for the electric mining vehicle provides an accurate estimate of the capabilities of the paired vehicle and energy storage device. Additionally, an exemplary energy management system according to embodiments of this disclosure may also be configured to combine information and real time data pertaining to one or more charging stations operating in the underground mine when arriving at accurate estimates of the capabilities of the various paired electric mining vehicles and energy storage devices.

Figure 4:
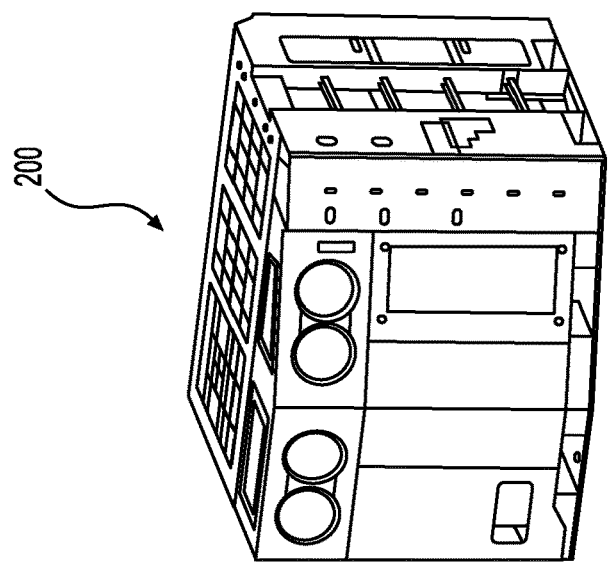
FIG. 4 is an illustration of an exemplary electric mining vehicle for an underground mine with an interchangeable energy storage device.
Figure 4:
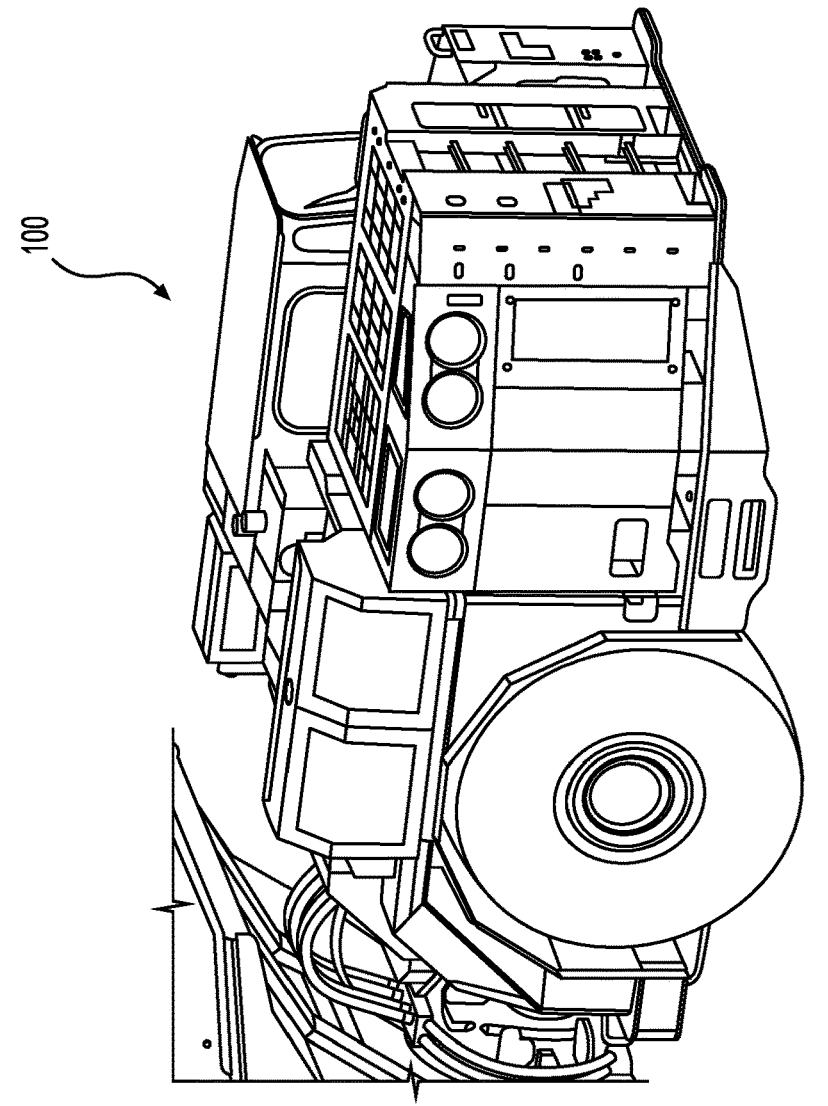
Figure 4:
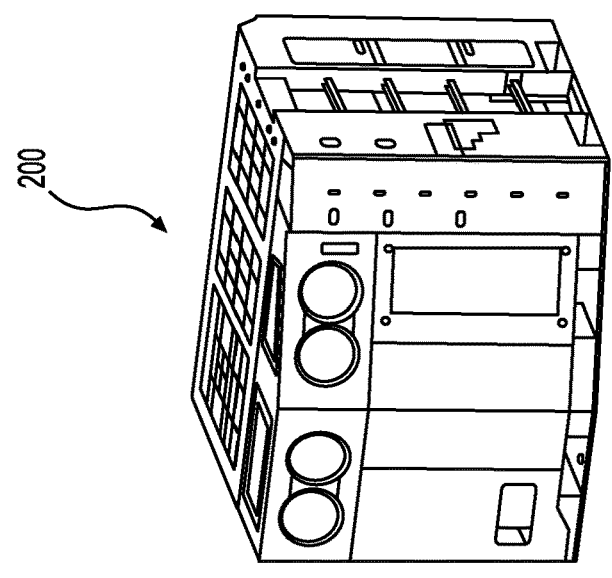
Figure 4:
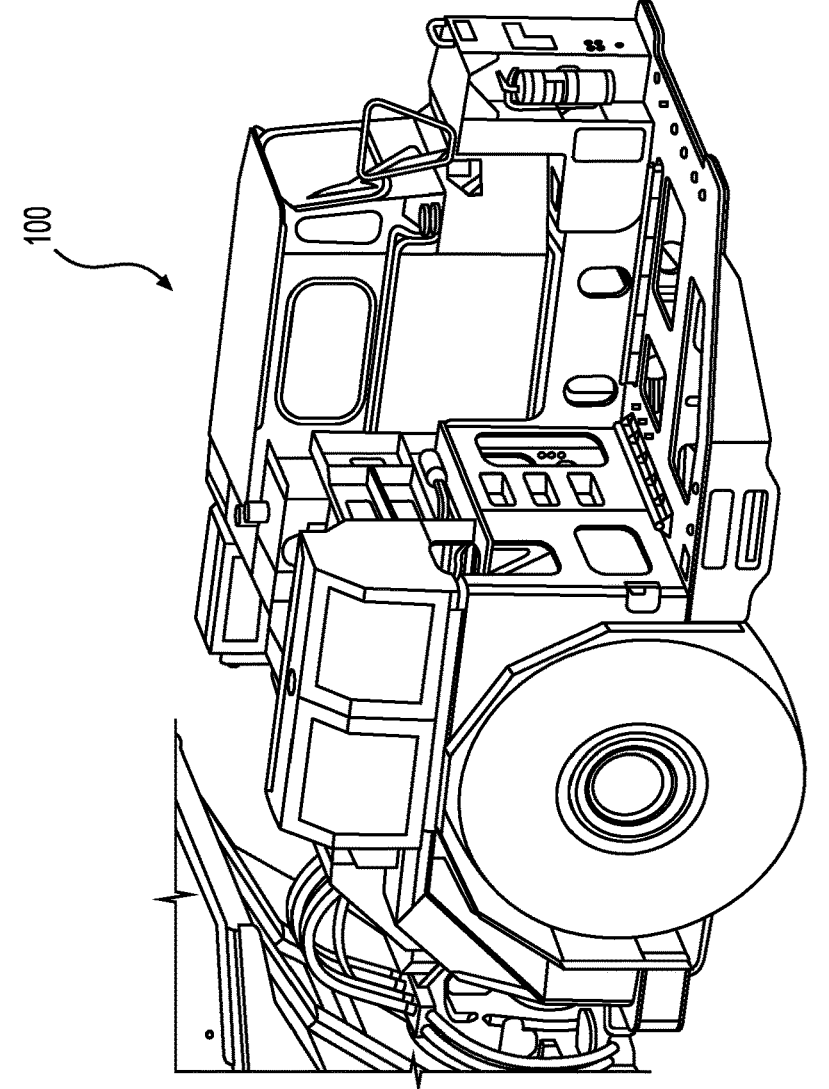

Each of the electric mining vehicles may be configured such that any one of the interchangeable energy storage devices may be mounted on or removed from an associated electric mining vehicle in a small enough amount of time such that swapping one of the interchangeable energy storage devices may be performed in less time than simply recharging an energy storage device already mounted onboard the vehicle. As shown in FIG. 4, a primary energy storage device 200 may be configured as an interchangeable module that may be treated as a separate entity from an electric mining vehicle on which it can be quickly installed or from which it can be quickly removed. In some exemplary implementations, one or more of the electric mining vehicles may also include a secondary battery of lower energy storage capability than the main, interchangeable energy storage device, with the secondary energy storage device providing enough power to move the vehicle for short distances or perform other tasks even when the main energy storage device has been removed or is out of charge. As a result, each of the energy storage devices and each of the electric mining vehicles may be considered as a separate machine characterized as an object of its remaining available energy and energy utilization. One or more controllers may be communicatively coupled with a central control office and each of the electric mining vehicles, the energy storage devices, and the charging stations.

The one or more controllers according to various embodiments of this disclosure may be programmed to receive data indicative of an energy utilization profile for each of the electric mining vehicles traversing each of the energy zones defined between wireless nodes in the mine based on a respective energy utilization efficiency of each respective electric mining vehicle as it travels in one of a loaded or unloaded condition along the energy zone. Additionally, the one or more controllers may be programmed to receive data indicative of an energy storage profile for each of the energy storage devices available to be installed on an associated electric mining vehicle traversing each of the energy zones based on sensed battery characteristic data including one or more of a State of Charge (SOC), State of Health (SOH), number of charge cycles, or cell temperatures for the energy storage device.

The one or more controllers may be programmed to determine productivity goals for the mine over a predetermined period of time, determine missions and prioritized tasks to be performed by each of the electric mining vehicles and each of the energy storage devices separately from the electric mining vehicles during the predetermined period of time, pair each electric mining vehicle with an energy storage device based on a determined mission or prioritized task, the energy utilization profile for the electric mining vehicle, and the energy storage profile for the energy storage device, and generate travel paths made up of a sequence of the energy zones for the paired electric mining vehicles and energy storage devices to complete the determined mission or prioritized task.

An underground mine energy management system according to some exemplary embodiments of this disclosure may include one or more controllers that are further programmed to: initially receive the data indicative of the energy utilization profile for each of the electric mining vehicles from one or more of historical data stored in a database, data calculated using physics-based equations, or empirically derived data, and then continually update the energy utilization profile in real time for the vehicle based on sensed performance data measured on the vehicle as the vehicle traverses each of the energy zones. Additionally, the underground mine energy management system according to some exemplary embodiments of this disclosure may include one or more controllers that are further programmed to: initially receive the data indicative of the energy storage profile for each of the energy storage devices from one or more of historical data stored in a database, data calculated using physics-based equations, or empirically derived data, and then continually update the energy storage profile in real time for the energy storage device based on sensed battery characteristic data measured on the energy storage device mounted on an associated electric mining vehicle traversing each of the energy zones.

An underground mine energy management system according to some exemplary embodiments of this disclosure may include one or more controllers that are further programmed to: receive data indicative of an energy charging capability for each of the one or more charging stations located throughout the underground mine based on measured discharge limits, connection status, and location for each charging station. The one or more controllers may be still further programmed to: generate a travel path for an electric mining vehicle made up of a sequence of energy zones that put less of a demand on the energy storage devices mounted on the electric mining vehicle when a charging station is not available along the travel path. In some cases, a controller may determine that changing a mission and travel path for an electric mining vehicle paired with a particular energy storage device may improve run time. In other cases, run time may be improved by changing out an energy storage device on a particular vehicle based on the SOC of the energy storage device and/or availability of charging station along a planned travel route. Additionally, the one or more controllers may be still further programmed to: consider environmental factors present in the sequence of energy zones making up a generated travel path when determining whether to pair a particular energy storage device with a particular electric mining vehicle for completing a determined mission or prioritized task. The one or more controllers may be programmed to determine that a particular energy storage device is not suitable to be paired with a particular electric mining vehicle when the energy storage profile of the energy storage device indicates that the SOH of the energy storage device is too low for the relatively high temperatures that may be present in energy zones below a predetermined depth in the underground mine. In some exemplary implementations, one or more of the electric mining vehicles may also include a secondary battery of lower energy storage capability than the main energy storage device, with the secondary energy storage device providing enough power to move the vehicle for short distances or perform other tasks even when the main energy storage device has been removed or is out of charge. The one or more controllers may be programmed to evaluate the energy storage profile and capabilities of the secondary energy storage device as well as the main energy storage device, and further determine optimum times for efficiently charging one or both of the primary and secondary energy storage devices based on the particular travel paths and sequence of energy zones. Reference to an energy storage device throughout this application will be understood to encompass one or more primary and secondary energy storage devices that may be mounted on an electric mining vehicle, either interchangeably or fixedly, depending on the particular vehicle and needs of that vehicle.

An underground mine energy management system according to some exemplary embodiments of this disclosure may include one or more controllers that are further programmed to first determine what mission or prioritized task is to be performed, then determine which of the one or more electric mining vehicles, which of the one or more energy storage devices, and, in some cases, which of the one or more charging stations is suitable for completing or assisting in completion of the determined mission or prioritized task within a desired run time to meet productivity goals set for the mine during a predetermined period of time. The one or more controllers may take into consideration energy utilization efficiency of each of a number of different electric mining vehicles and battery characteristic data for each of a number of different energy storage devices when determining which vehicles to pair with which energy storage devices. The one or more controllers may be still further programmed to: determine that a prioritized task takes priority over productivity goals when the prioritized task includes one or more of clearing mined material from an area of the underground mine being developed, moving vehicles from a congested area of the mine, taking advantage of the availability of a loading tool at a location in the mine where mined material is being pulled, or other tasks that must be completed as soon as possible in view of near term or longer term goals, safety considerations, or potential emergencies.

Figure 3:
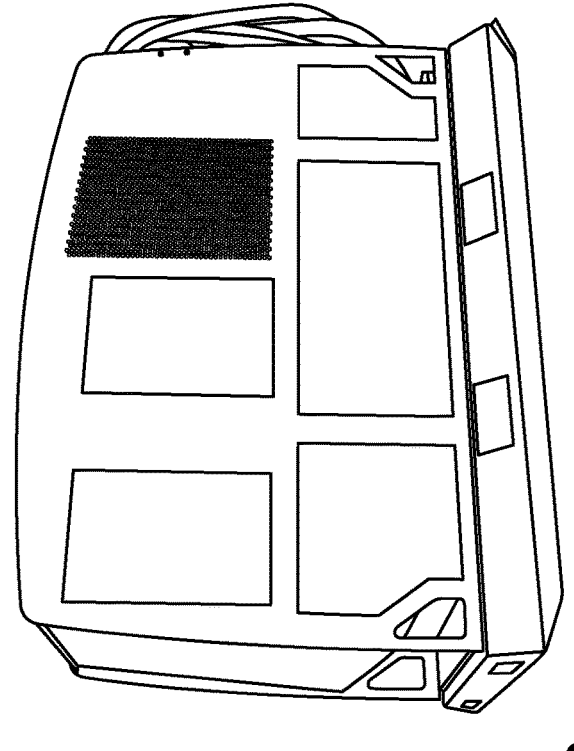
FIG. 3 shows exemplary energy profile matrices and status for electric mining vehicles, energy storage devices and underground charging stations.

FIG. 3 illustrates one exemplary combination of energy utilization profiles of a plurality of mining vehicles, as represented by a truck energy matrix, which are then selectively combined with energy storage profiles of a plurality of energy storage devices, as represented by a battery energy matrix. The data provided to the matrices may initially be determined through historical information obtained during operation of similar machines and energy storage devices over similar energy zones, with the data being continually updated based on real time measured performance data and battery statistics. Characteristics of one or more chargers, such as also shown in FIG. 3, which may be chargers available to a particular electric mining machine and/or a particular energy storage device prior to embarking on a mission or prioritized task, are also factors that the one or more controllers of an energy management system may take into consideration when determining which electric mining machine to pair with which energy storage device.

One or more controllers according to exemplary embodiments of this disclosure may be programmed to identify particular sequences of energy zones between pairs of wireless nodes in mapping out potential travel routes over which a particular electric mining machine may be operated in order to perform certain prioritized tasks, while minimizing run times, and maximizing efficiencies and productivity. The one or more controllers may be programmed to receive data indicative of the historical health, performance, and energy usage of a particular electric mining machine with particular physical and operational characteristics, and a particular energy storage device powering the machine over a particular travel route segment. In some exemplary embodiments, the one or more controllers may also be programmed to compare historical data with present, real time data indicative of machine and battery health, performance, and energy usage for a same or similar machine traversing same or similar energy zones, and use the results of the comparison to estimate energy usage for new sequences of energy zones over a new travel route, and assess battery health and performance. The data regarding energy utilization profiles for the electric mining vehicles, energy storage profiles for the energy storage devices, and data relevant to the various available charging devices may be continually updated based on actual real time measurements in order to account for a number of factors that may result in continual stresses on the equipment, including cooling systems, and potential degradation of components and systems, including environmental factors such as temperatures and road conditions in the mines.

The devices, systems, and methods according to various embodiments of this disclosure may be configured to monitor the energy consumption of an electric mining vehicle and/or energy storage device using a feedback loop to improve assumptions and estimations of energy usage of a particular electric mining vehicle traveling over a particular energy zone between identified wireless nodes of a travel route, and monitor vehicle and battery health. The improved estimations of energy usage may enable enhanced management of an individual electric mining vehicle, a fleet of vehicles, and overall energy usage and peak power demand at an underground mine site where the electric mine vehicles, energy storage devices, and charging stations are operating. Various exemplary embodiments may include one or more controllers configured (programmed) to estimate the energy that will be required by or provided by a particular machine (wherein reference to a "machine" may include an electric mining vehicle that consumes energy, an energy storage device that provides energy, or a charging station that generates energy for recharging the energy storage devices). The one or more controllers may be programmed to determine the energy consumed while traveling and performing specific tasks over specific energy zones that make up a predetermined travel route, including making assumptions of factors indicative of or contributory to the energy consumption, storage, or generation, such as the location of the particular travel route being traversed by the machine, the machine system efficiencies for that machine, site operational information such as speed limits, delays, and safety requirements, environmental conditions, physical characteristics of the route, such as soft underfoot conditions, type of surface, granularity of the surface, wetness or dryness of the surface, topography, the battery state-of-health (SOH), state-of-charge (SOC), and number of charge cycles for the energy storage device, and other machine and/or power supply performance characteristics. The assumptions made by the one or more controllers may be based on real time measured or observed characteristics, data retrieved from one or more databases stored in memory onboard the machine, and/or historical or empirical information provided by a central command or back office servers. The exemplary embodiments may also include the one or more controllers being configured to measure the actual factors indicative of energy consumption of the machine along the different travel route segments for the machine, including measuring all of the factors that were assumed and/or estimated, and then updating the assumptions and estimations of the energy consumption based on the actual measured factors, in some cases using machine learning, virtual modelling, and other artificial intelligence techniques.

The battery state-of-health (SOH) is a "measurement" that reflects the general condition of a battery and its ability to deliver a specified performance compared with a fresh battery. SOH takes into account such factors as charge acceptance, internal resistance, voltage and self-discharge. It is a measure of the long term capability of the battery and gives an "indication," not an absolute measurement, of how much of the available "lifetime energy throughput" of the battery has been consumed, and how much is left.

The state-of-charge (SOC) of a battery represents the short term capability of the battery. During the lifetime of a battery, its performance or "health" tends to deteriorate gradually due to irreversible physical and chemical changes which take place with usage and with age until eventually the battery is no longer usable or dead. The SOH is an indication of the point which has been reached in the life cycle of the battery and a measure of its condition relative to a fresh battery. Unlike the SOC which can be determined by measuring the actual charge in the battery, there is no absolute definition of the SOH. It is a subjective measure in that different people derive it from a variety of different measurable battery performance parameters which they interpret according to their own set of rules. It is an estimation rather than a measurement, but preferably an estimation based on a consistent set of rules using comparable test equipment and methods. Battery manufacturers do not specify the SOH because they only supply new batteries. The SOH only applies to batteries after they have started their aging process either on the shelf or once they have entered service. The SOH definitions are therefore specified by test equipment manufacturers or by the user.

The SOH of a battery may be used to provide an indication of the performance which can be expected from the battery in its current condition or to provide an indication of how much of the useful lifetime of the battery has been consumed and how much remains before it must be replaced. In critical applications, such as on electric mining vehicles operating in deep underground mines where access to repair or servicing facilities is limited, the SOC gives an indication of whether a battery will be able to support the load and achieve a desired range when called upon to do so. Knowledge of the SOH will also help to anticipate problems to make fault diagnosis or to plan replacement or servicing. This is essentially a monitoring function tracking the long term changes in the battery.

Any parameter which changes significantly with age, such as cell impedance or conductance, or cell temperatures can be used as a basis for providing an indication of the SOH of the cell. Changes to these parameters will normally signify that other changes have occurred which may be of more importance to the user. These could be changes to the external battery performance such as the loss of rated capacity or increased temperature rise during operation or internal changes such as corrosion. Because the SOH indication is relative to the condition of a new battery, the measurement system should retain a record of the initial conditions or at least a set of standard conditions. Thus if cell impedance is the parameter being monitored, the system must keep in memory as a reference, a record of the initial impedance of a fresh cell. If counting the charge/discharge cycles of the battery is used as a measure of the battery usage, the expected battery cycle life of a new cell would be used as the reference. In a Lithium ion battery, since the cell capacity deteriorates fairly linearly with age or cycle life, the expired, or remaining cycle life, depending on the definition used, is often used as a crude measure of the SOH. Impedance or the cell conductance may also be used. In pursuit of accuracy, several cell parameters may be measured, all of which vary with the age of the battery, and an estimation of the SOH may be derived from a combination of these factors. Examples are capacity, internal resistance, self-discharge, charge acceptance, discharge capabilities, the mobility of electrolyte, and cycle counting if possible. The absolute readings will depend on the cell chemistry involved. Weighting may be added to individual factors based on experience, the cell chemistry and the importance the particular parameter in the application for which the battery is used. If any of these variables provide marginal readings, the end result will be affected. A battery may have a good capacity but the internal resistance is high. In this case, the SOH estimation will be lowered accordingly. Same or similar demerit points may be added if the battery has high self-discharge or exhibits other chemical deficiencies. The points scored for the cell are compared with the points assigned to a new cell to give a percentage result or figure of merit. Such complex measurements and processing may be performed by one or more processors of controllers used in performing various methods according to embodiments of this disclosure. Some embodiments may also employ machine learning or other artificial intelligence techniques to derive more useful indications of SOH for a battery.

An alternative method of specifying the SOH is to base the estimation on the usage history of the battery rather than on some measured parameter. The number of charge—discharge cycles completed by the battery is an obvious measure, but this does not necessarily take into account any extreme operating conditions experienced by the battery which may have affected its functionality. It is however possible to record the duration of any periods during which the battery has been subject to abuse from out of tolerance voltages, currents or temperatures as well as the magnitude of the deviations. From this data a figure of merit representing the SOH can be determined by using a weighted average of the measured parameters. Battery usage data can be stored in memory and downloaded when required.

The devices and systems for managing the energy consumption of an electric mining vehicle may include power management logic that can calculate an estimated energy requirement for an energy storage device mounted on the vehicle such that the vehicle can complete a desired mission or task based on information provided from the external environment of the vehicle, the operational status of the vehicle, the energy utilization efficiency of the vehicle, the rolling resistance encountered by the vehicle over a particular energy zone, one or more command inputs from an operator or from a fully autonomous controller, and one or more operational parameters of the vehicle. The information provided to the power management logic may come from data inputs (e.g., sensors, telemetries, etc.), memory, user commands, or it may be derived through the use of empirical formulas and physical principles. The power management logic may comprise software, hardware, or any combination of software or hardware. In some variations, the devices and systems may include one or more processors (e.g., a microprocessor) that can perform the power management logic, and use machine learning and other artificial intelligence techniques to develop and improve virtual models that may be used in predicting the energy consumption for a particular electric mining vehicle and associated energy storage device traveling over a particular energy zone between nodes in the mine, and/or the energy consumption for one or more electric mining vehicles, or even an entire fleet of mining vehicles traveling over many different predefined energy zones within an underground mine. The predicted energy consumption that is determined by the power management logic running in one or more controllers according to various embodiments of this disclosure may be used along with other information to make decisions, such as illustrated in the flow chart of FIG. 5 and the tables of FIGS. 6 and 7, command control of a machine, and implement changes, such as changes to the specific energy zones and travel route that will be taken by one or more vehicles, changes to the missions or tasks that will be performed by the one or more vehicles, changes to the operational parameters for the one or more vehicles, and even potential changes to repair and maintenance of the road surfaces in the tunnels that will be traversed by the one or more vehicles in the performance of its/their tasks.

In some exemplary embodiments, power management logic may be used in conjunction with an electric motor control mechanism to control the amount of electric power consumed by the motor as the electric mining vehicle travels through particular energy zones along a particular travel route. The consumed power may be expressed as an optimized speed or speeds to which the vehicle is controlled, alone or in combination with the types of tasks that may be performed by the vehicle along the segment. For example, the electric motor control mechanism may adjust the speed of the electric mining vehicle and/or other operational parameters to an optimized speed or other optimized operational parameters as the vehicle travels over a particular travel route, or may control performance of various tasks to be performed by the machine, such as earth moving tasks, including drilling, digging, and hauling. In some circumstances, the unpredictability of the rolling resistance that will be encountered by the vehicle when traveling over particular energy zones, as a result of changes in the road surface conditions from continual use, for example, may result in frequent real time updates to the actual energy consumption for particular energy zones as compared with predicted energy consumption for those energy zones, and the use of machine learning in the power management logic may enable continual improvements in predictive models of energy consumption for the electric mining vehicles and energy storage devices operating over particular energy zones.

The systems and methods according to various embodiments of this disclosure may be used in predicting the energy requirements for a particular electric mining vehicle to traverse a particular energy zone or sequence of energy zones that make up a travel route at an underground mine site and complete its desired tasks, or the energy requirements for more than one machine, such as a plurality of electric mining vehicles in a fleet of machines being operated at one or more sites. Large electric mining vehicles used to perform various mining and other earth moving tasks, may have limited range as a result of the relatively high amount of energy required to power such machines in conjunction with limited amounts of space and weight capacity on the machinery for storing batteries that provide the energy. Therefore, predicting the energy requirements for upcoming energy zones over which a machine will be operated and over which it will perform various tasks is important for determining whether the machine will be able to complete certain tasks with the available amounts of energy, and then return to a battery exchange or charging station. The systems and methods according to various embodiments of this disclosure may also be used with hybrid machines that are powered by a combination of batteries and other energy sources such as internal combustion engines or fuel cells.

In some embodiments, a prediction of energy requirements for upcoming travel route segments may apply to more than one machine, and machine learning or other artificial intelligence techniques may be employed for managing the most efficient and effective distribution of travel and task assignments amongst the plurality of machines. A system and method for estimating and predicting the energy requirements for a vehicle that will be operated over predetermined energy zones may include estimating and predicting various factors indicative of or contributory to the energy consumption such as the location of the vehicle, the system efficiencies for that vehicle, site operational information such as speed limits, delays, and safety requirements, characteristics of the route, such as soft underfoot conditions, type of surface, granularity of the surface, wetness or dryness of the surface, topography, the battery state-of-health (SOH), state-of-charge (SOC), cell temperatures, and number of charge cycles for the energy storage device (battery or batteries) powering the machine, cooling system efficiency, and other machine performance characteristics. The assumptions made by one or more controllers operating power management logic may be based on real time measured or observed characteristics, data retrieved from one or more databases stored in memory onboard the machine, and/or information provided by a central command or back office servers. The exemplary embodiments may also include the one or more controllers being configured (programmed) to measure the actual factors indicative of energy consumption of the machine along the different energy zones and travel route segments for the machine, including measuring all of the factors that were assumed and/or estimated, and then updating the assumptions and estimations of the energy consumption based on the actual measured factors, in some cases using machine learning, virtual modelling, and other techniques.

A system including one or more controllers programmed with the power management logic and configured to perform the methods according to various embodiments of this disclosure for managing the energy consumption of an electric mining vehicle may be manually engaged by an operator either when the vehicle is initially turned on, or in the midst of a work operation. In various exemplary implementations, an operator or an autonomous or semi-autonomous control system may set a preferred speed, and a range at which to manage that speed over at least a portion of a planned trip along predetermined energy zones and travel route segments, one or more drive train gear ratios, amounts of braking, including dynamic braking during which energy may be generated and stored onboard the machine, tasks to be performed, and/or other operational parameters. The system and method may include determining an optimal (e.g., most efficient utilization of battery charge) speed, gear ratio, braking, and tasks to be performed within the range selected. By calculating and then averaging the most efficient operational parameters over a given route, estimating and then measuring actual energy consumption, and then employing a feedback loop to improve various assumptions made during the estimation process, the system can optimize energy usage within the machine's stated speed, desired tasks, and range, and adapt and change planned travel routes, tasks to be performed by the machine, or even issue commands for maintaining or repairing road surfaces over particular travel route segments when it is determined that the rolling resistance being encountered by the machine exceeds expected threshold amounts of rolling resistance. Rolling resistance encountered by a machine traveling over a particular travel route segment may be estimated in real time based on the measured actual amounts of energy being consumed, and comparison of those measured actual amounts of energy to historical amounts of energy consumed by a same or similar vehicle traveling over a same or similar energy zone or travel route segment. The power management logic may determine energy efficiency for a particular vehicle over the course of one or more energy zones and travel route segments. The destination or exact travel path of the machine does not have to be known ahead of time (e.g., input into a GPS or other same or similar system by an operator). The system (e.g., anticipated destination logic) may infer the destination for a particular site based on a subset of the information inputs to the system, such as the time of day, current location, work assignments, and other inputs. In some variations, an operator or autonomous or semi-autonomous controller can accelerate or decelerate (e.g., override the system) for emergency situations such as passing, braking and the like, depending on other machines or obstacles encountered at a work site. In some variations, the systems and methods according to various embodiments of this disclosure may provide suggested speeds, accelerations, manners in which particular tasks are performed, etc., to an operator or autonomous or semi-autonomous controller in order to better optimize power usage.

In some variations, the system may be onboard the machine and completely independent from any exterior sources of information (other than onboard sensors), or, alternatively, automatically enabled via instructions received over a wireless communication system from a back office or other central server, or from one or more remote servers on the cloud. In some implementations, an operator or autonomous or semi-autonomous control system for the machine may set a destination, mission, target speed, accelerations, range, prioritized tasks to be performed, or other variables. By automatically monitoring the machine's real-time speed, braking and acceleration, and other data received from various sensors onboard the machine and/or from one or more databases, the power management logic implemented by a control system according to various embodiments of this disclosure may predict energy usage based on comparisons of historical and real time data for same or similar machines operating along same or similar energy zones and travel route segments and determine the most efficient speed, acceleration, braking, and other operational parameters for completing desired tasks along various travel route segments.

In some variations, the operator or autonomous control system may provide a destination and list of tasks to be performed, and the control logic, including machine learning algorithms and virtual energy consumption models created and implemented by the power management logic of the control system, may determine the optimal speeds, gear ratios, and other operational parameters for the machine while it is operating along one or more travel route segments. The system may use safety parameters in place at a particular job site, such as speed limits and allowable proximity to other machines, road surface conditions, the presence of soft underfoot conditions, type of surface, granularity of the surface, topography, the battery state-of-health (SOH), state-of-charge (SOC), cell temperatures and number of charge cycles for the battery or batteries powering the machine, and other machine performance characteristics, physical calculations, and statistical models from previous trips along the same or same or similar travel route segments to select the optimal operational parameters for the machine.

One or more controllers according to embodiments of this disclosure onboard an electric mining vehicle for managing the energy consumption of the machine may be programmed with power management logic operable to calculate predicted energy requirements for the various energy storage devices (one or more batteries) that may be available to be paired with a particular vehicle, such as the various types of heavy equipment operated at an underground mine, from information about the external environment where the vehicle is operating, information about the operational status of the vehicle and/or energy storage device, one or more command inputs, and one or more operational parameters of the vehicle. The one or more controllers may include processors implementing the power management logic, and various machine system control mechanisms, wherein the machine system control mechanisms control the application of power provided by the one or more batteries onboard the vehicle to the various traction control and other output mechanisms of the vehicle.

The power management logic may determine energy requirements potentially imposed upon the one or more energy storage devices based on information characterizing the electric mining vehicle, operation of the vehicle, and the environment of the vehicle, which may include the current location of the vehicle, the elevation of the vehicle, upcoming elevations of the vehicle, the current slope/grade of the route, the predicted slope/grade of the next segments (or upcoming segments) of the route, tasks to be performed by the vehicle, speed limit information of the current energy zone, speed limit information of upcoming energy zones, the surface conditions of the known or predicted route (or a portion thereof), proximity and predicted travel paths for other vehicles and equipment in the vicinity of the vehicle, the location of the various travel route segments at a particular job site, current temperature, the predicted temperature for upcoming route segments, current air pressure, predicted air pressure for upcoming route segments, time of day, date, day of week, visibility, present road surface conditions, predicted road surface conditions for upcoming travel route segments, and the distance to/from other machines operating at the job site. Any of this information may be acquired by measuring (e.g., from sensors), or it may be detected or input (e.g., from manual inputs, telemetry, detectors, a memory, etc.), or it may be derived (e.g., based on other information, including other environmental information).

The power management logic may determine energy requirements for the machine batteries based on information about the operational status of the machine. The operational status information input may include the machine's current speed, the machine's current orientation, the wheel rotations per minute, the battery state-of-charge, battery state-of-health, number of battery charge cycles, the voltage of the battery, the amp hours from the battery, the temperature of the battery, the age of the battery, tire pressures, the drag force due to rolling resistance of the machine, the weight of machine (including payload of the machine), the efficiency of the cooling system of the machine, and other operational parameters. Any of this information may be acquired by measuring (e.g., by sensors), or it may be input (e.g., from an external telemetry, a memory, etc.), or it may be derived (e.g., based on other information, including other operational status information).

A control system utilizing power management logic according to various implementations of this disclosure may be programmed for monitoring the health and charge of batteries used to power an electric mining vehicle, issuing an alarm or alert when historical energy usage for a particular vehicle traversing a particular energy zone and/or travel route segment differs from data indicative of present energy usage for a same or similar vehicle traversing a same or similar energy zone or travel route segment by more than a threshold value, and determining or predicting the maintenance or replacement requirements or schedule for the batteries as a function of the energy zones over which the vehicle is operated. The control system may be programmed to determine the vehicle location, determine a terrain on which the vehicle is operating, estimate soil conditions, such as a terrain surface coefficient of friction, and provide output signals indicative of data representing present performance information for the vehicle including one or more of the present battery state-of-charge, battery state-of-health, and number of charge cycles for each of the batteries used to power the electric mining vehicle, speed, pose, size, weight, tire type, load, cooling system performance, and gear ratio, and road conditions and characteristics for each of the energy zones and travel route segments over which the vehicle is operating at a job site, using a sensing system. The system may also be programmed to receive historical information mapping the performance and energy consumption of one or more vehicles operating over one or more travel route segments of the job site. The historical performance information may include one or more of battery state-of-charge, power usage, battery state-of-health, and number of charge cycles for the one or more batteries supplying power to the one or more vehicles with associated physical and operational characteristics as the one or more energy storage devices were operated over one or more travel route segments. The system may be still further programmed to compare the historical performance and energy consumption information for a same or similar vehicle traveling on a same or similar travel route segment to the present performance and energy requirements while compensating for energy consumption contributing factors that are not common to both the historical performance and the present performance, and provide a fault warning or other indicator that the battery requires service or replacement, or that there may be some other error associated with the power system. The system may be programmed to automatically schedule a machine for service or assign a route to the machine for service, and/or instruct an operator or autonomous control system to replace or perform maintenance on the batteries if the difference between present and historical performance exceeds a threshold level. In some exemplary embodiments, the system may be programmed to provide an alert, and/or modify or even cancel pending missions or prioritized tasks based on the difference between present and historical performance exceeding a threshold level.

The power management logic may also determine energy requirements for the machine batteries based on command input information. Command input information may include the acceleration applied by an operator or autonomous or semi-autonomous control system, braking, the intended destination, preferred speed, maximum and minimum range over which speed should adjust, and preferred route. Any of this information may be acquired by input (e.g., from an external telemetry, keyboard, mouse, voice command, a memory, etc.), sensor (e.g., optical detectors, etc.), or it may be derived (e.g., based on other information, including other command information).

The power management logic may also determine energy requirements for the machine batteries based on information about one or more operational parameters of the machine. Operational parameters may include aerodynamic parameters, rolling resistance parameters, drive train efficiency parameters, electric motor efficiency parameters, and battery model parameters, battery charge and discharge relationships, type of battery, and other factors. Any of this information may be input (e.g., from an external telemetry, a memory, etc.), or it may be derived (e.g., based on other information, including historical information or other operational parameter information).

The power management device or system according to various embodiments of this disclosure may still further include a memory containing machine information about one or more operational parameters for one or more machines. The memory may store any of the information about the operating characteristics and parameters for each type, make, and model of machine or equipment, age and condition of each individual machine and its various operating systems and components, operational status of the one or more batteries on each machine, including state-of-charge, battery state-of-health, and charge cycles for each battery, with the information including derived or historical information.

Systems for managing the energy consumption of a machine, or other heavy equipment, according to exemplary embodiments of this disclosure, may include a first input, operable to receive information about the environment where the machine is operating, a second input, operable to receive information about operational parameters of the machine, a third input, operable to receive one or more command inputs from an operator or autonomous control system of the machine, a memory containing information about one or more operational parameters of the machine, power management logic operable to calculate energy requirements for the machine's one or more batteries from the first input, the second input, the third input, and the memory, and one or more processors responsive to the power management logic.

Methods of predicting and managing the energy consumption of an electric mining vehicle, may include calculating predicted energy consumption for the machine traversing one or more energy zones and travel route segments using one or more special purpose processors programmed with the power management logic according to various embodiments of this disclosure. The power management logic receives data related to energy consumption. The one or more special purpose processors (e.g., microprocessors, programmable logic controllers (PLC's) etc.) may receive a first input comprising information about the environment of the machine, a second input comprising information about the operational parameters of the machine, a third input comprising a command input from the operator of the machine or autonomous control system, and a fourth input comprising machine information about the operational parameters of the machine. The method may also include the step of controlling the power output from one or more batteries of the machine to achieve desired speeds and performance of various tasks over particular travel route segments.

The step of calculating required power output from the batteries of the machine may include determining a particular energy zone and/or travel route, calculating a predicted energy usage for each segment, totaling the segment energy usage, and assigning routes based on the available charge. The most energy efficient route for accomplishing a given task may take into account the current battery state-of-charge (SOC), and availability and location of a charging station. A display may be provided to an operator with an optimal speed, or commands may be provided to an autonomous system to maintain a certain speed determined to be an energy efficient speed for the machine to traverse the travel route segments. The required power output from the battery may be calculated continuously. For example, the required power output may be calculated at each point (e.g., every energy zone, or points within a segment) as the machine is driven. Thus, over an entire route, the most energy efficient speed at which to drive may be continuously calculated. This may be done by determining a destination, and then coming up with a route for that destination. If the destination is not known (e.g., has not been provided to the power management device or system), a predicted destination may be estimated, based on statistical destination logic (e.g., using map coordinates, and the historical operation of the machine). Energy efficient speeds for current and upcoming route segments can then be calculated based on the route. In some variations, the route is divided up into many distinct sequences of energy zones based on terrain, areas of an underground mine where particular tasks are to be performed, intersections, etc. In some variations, the optimized speed for the electric mining vehicle is determined based on historical speeds for same or similar destinations. The route can be revised (e.g., continuously revised) during operation.

When a new route with one or more new energy zones is received by the one or more controllers implementing power management logic according to various embodiments of this disclosure, the power management logic may be programmed to compare each new energy zone to energy zones in a database having certain characteristics and determine matches. The logic may then determine what other electric mining vehicles have already traversed the same or similar energy zones, and based on this historical information, determine optimal energy storage device energy usage for comparable energy zones and comparable electric mining vehicles. The logic may also be programmed to attempt to find a best pairing between available electric mining vehicles and energy storage devices, based on characteristics such as type, make, and model of electric mining vehicle, weight, and other characteristics to select a best prior estimation of battery or other power source energy usage for each historical energy zone. In some cases, where same or similar vehicles have traversed the same energy zones, the logic may average or otherwise accumulate data to provide a best estimation of usage for that segment. In some cases an average weight for a particular type of machine can be used (loaded versus unloaded conditions). In addition, or alternatively, a gain factor may be used to scale an expected amount of energy usage depending on the machine load being carried. Additional parameters such as ambient temperature, time of day, weather, road conditions, and same or similar factors may be employed in the matching process. Additionally, the data associated with particular machine operators and their historical operational statistics for power efficiency, etc., for a particular machine may also be considered.

The power supplied and used by a particular electric mining vehicle and paired energy storage device can be optimized based on information inputs including: user demands, environmental conditions, the current or anticipated operational state of the machine, and the operational parameters for the machine. These parameters can be estimated, directly measured, or derived, and may be used to determine the sequence of energy zones or travel route, types of tasks performed, order in which tasks are performed, repair or maintenance of travel route segments over which the machine will travel, etc., and therefore an estimated power requirement for the route. The estimated power requirement for a route and a historical power requirement from the same or similar vehicle traveling over the same or similar sequence of energy zones may be used to determine the optimal power usage by a particular vehicle paired with a particular energy storage device. The power required of a machine and the optimal power supplied and used by a machine may also be expressed in terms of the speed or velocity of the machine, tasks to be performed by the machine, and other energy usage parameters.

The power management devices and systems described herein may manage the power usage of the machine using inputs from four categories of information input: information from the external environment of the machine, information about the operational status of the machine—including energy utilization of the vehicle and energy storage characteristics of the energy storage device, information from one or more command inputs, and operational parameters of the machine.

Examples of command inputs include, but are not limited to: the acceleration applied by an operator or commanded by an autonomous control system, the braking applied by an operator, the machine's known or predicted final destination, the machine's known or predicted interim destination, tasks to be performed by the machine, preferred speed, maximum and minimum range over which speed should be adjusted, and preferred route. As with all of the information inputs, some of the command inputs may be redundant, or may be derived from related information. For example, a route destination may be input by the operator, or it may be inferred from the driving behavior and/or identity of the operator. The identity of the operator may also be input by the operator, or it may be inferred. For example, the identity of the operator may be matched to the weight of the operator. Command inputs may include any of the operator's actions to control the machine. For example, command inputs may include steering, breaking, shifting, application of the accelerator, or application of other controls for performing designated tasks. The power management device may include sensors, inputs or detectors to monitor the manipulations of the operator. In some variations, the operator may directly input commands to the power management system or to other devices in the machine that communicate these commands to the power management system. For example, the operator may use an on-board navigational system to select a destination, and this destination may be communicated to the power management system. In some variations, the user may provide commands directly to the power management system. In some variations, the command inputs may be derived from other information, including the environmental information and the operational status information. For example, the destination (either a final or an intermediate destination) may be estimated based on the current location of the machine, the direction that the machine is traveling, the time of day and/or the operator of the machine.

Information inputs, including command inputs, may have default or pre-set values. For example, the power management device or system may have a preset or default maximum and minimum range of speeds for traveling part of the route (e.g., if the maximum and minimum range has not been explicitly input, the maximum and minimum range may be set to +/−4 mph). In some variations, the information inputs may include metadata describing one or more features of an information input. Metadata may include information about the information input. For example, metadata may indicate the last time a particular data input was updated, or may indicate that the data is a default setting, or the like.

These examples of command inputs are only intended to illustrate the kinds of command inputs that may be used by the power management devices and systems described herein. Any appropriate command input may be provided to the power management device or used by the power management device. Information from one or more operational parameters of the machine may be used to determine the optimal power to apply to the machine. Operational parameters generally include information about characteristics that are specific to the machine (e.g., characteristics of component parts of the machine, including the one or more batteries, the powertrain, the tires, etc.). Operational parameters of the machine may be stored and retrieved from a memory that is part of the power management device or system, or they may be retrieved from a remote information source.

Any number and different types of electric mining vehicles 100 may make up a fleet of vehicles simultaneously and cooperatively operating along the tunnels and passageways of the underground mine. For example, a loading machine may be stationed at the first location and assigned to fill another work machine (e.g., a haul truck, etc.) with material. Other work machines may be tasked with traveling up and down throughout an underground mine to condition the travel paths, to clean up the work locations, to perform safety procedures, such as shoring up roof supports, and checking levels of gases, and/or to service other work machines at any location of the underground mine.

The one or more controllers according to various exemplary embodiments of this disclosure may embody a single or multiple microprocessors, field programmable gate arrays (FPGAs), digital signal processors (DSPs), etc., that include a means for controlling operations of electric mining vehicles or automated energy storage device transport utility vehicles in response to the needs of a particular underground mine site. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

INDUSTRIAL APPLICABILITY

The disclosed energy management system may be applicable to any underground mining site that includes electric mining vehicles, energy storage devices, and charging stations according to various embodiments of this disclosure.

Figure 5:
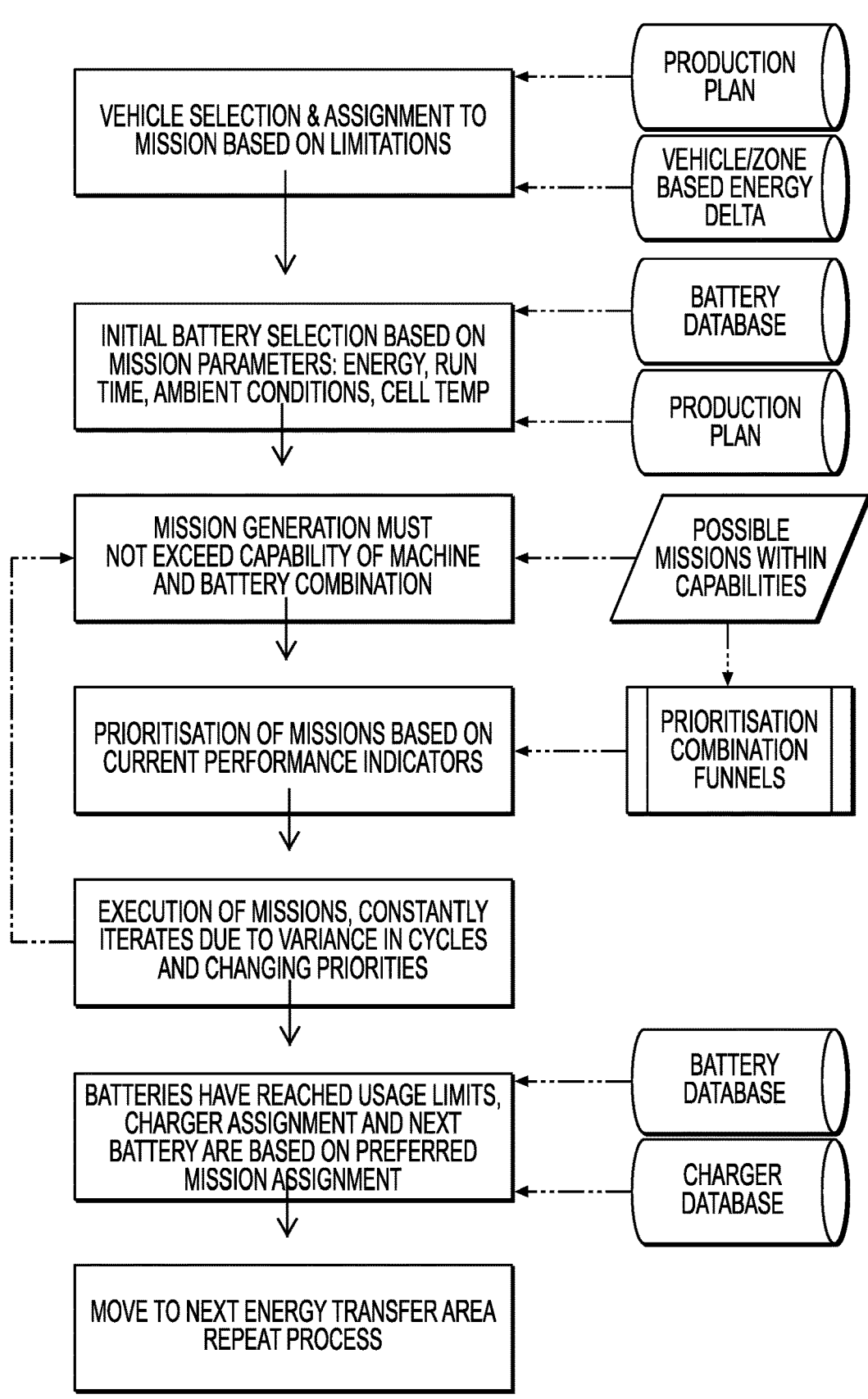
FIG. 5 is a flow chart illustrating exemplary control logic implemented by a controller according to an embodiment of this disclosure.

A method of managing energy consumption in an underground mine, as disclosed herein, and as illustrated, for example, in the flow chart of FIG. 5, wherein the mine includes a plurality of wireless nodes located at different 3D coordinate positions along travel paths throughout the underground mine, and wherein energy zones are defined between respective pairs of the plurality of wireless nodes, may include: communicating, using one or more controllers, with a central control office for the mine and each of a plurality of electric mining vehicles, a plurality of energy storage devices configured to be universally and interchangeably installed on and removed from an associated electric mining vehicle, and a plurality of charging stations, all operating within the underground mine. The energy storage devices may be configured to be one or more of charged at one of the charging stations or installed on a different electric mining vehicle, depending on mine productivity goals or specific missions or prioritized tasks to be performed in the underground mine. The method of managing energy consumption may include receiving, by the one or more controllers, data indicative of an energy utilization profile for each of the electric mining vehicles traversing each of the energy zones based on a respective energy utilization efficiency of each respective electric mining vehicle as it travels in one of a loaded or unloaded condition along the energy zone. The method may further include receiving, by the one or more controllers, data indicative of an energy storage profile for each of the energy storage devices available to be installed on an associated electric mining vehicle traversing each of the energy zones based on sensed battery characteristic data including one or more of a State of Charge (SOC), State of Health (SOH), number of charge cycles, or cell temperatures for the energy storage device. Vehicle selection and assignment to particular missions may be based at least in part on limitations of a particular vehicle, zone characteristics such as the potential energy required to traverse a particular zone with a particular vehicle and/or energy storage device, and particular production plans. Initial selection of an energy storage device from available energy storage devices may be based, at least in part, on particular mission parameters, battery characteristics such as SOC, SOH, cell temperatures, and charge cycles, which may be obtained from one or more databases, and environmental factors such as ambient temperatures and humidity.

The one or more controllers may be programmed to determine productivity goals for the mine over a predetermined period of time, specific missions, and prioritized tasks to be performed by each of the electric mining vehicles and each of the energy storage devices separately from the electric mining vehicles during the predetermined period of time. The one or more controllers may determine which electric mining vehicle should be paired with which energy storage device based on a determined mission or prioritized task, an energy utilization profile for the electric mining vehicle, and an energy storage profile for the energy storage device. The one or more controllers may then determine specific travel paths made up of a sequence of the energy zones to be followed by the paired electric mining vehicles and energy storage devices to complete the determined mission or prioritized task within a desired run time to meet productivity goals or other mission parameters set for the mine during the predetermined period of time. Prioritization and execution of missions may be based at least in part on current performance indicators, and the determined travel paths consisting of particular sequences of energy zones, along with other variables such as choice of particular vehicles, energy storage devices, and available charging stations, may be continually iterated as additional data gathered in real time indicates changing energy utilization profiles, changing energy storage profiles, changing charger availability, changing mission priorities, etc. As particular energy storage devices are utilized to the point of low SOC, SOH, excessive cell temperatures, or other usage limits, assignments of particular chargers, and/or preferred mission assignments may be modified and the energy storage devices may be repositioned, recharged, or taken out of service.

It will be apparent to those skilled in the art that various modifications and variations can be made to the disclosed energy management system and methods. Other embodiments will be apparent to those skilled in the art from consideration of the specification and practice of the disclosed energy management system. It is intended that the specification and examples be considered as exemplary only, with a true scope being indicated by the following claims and their equivalents.

What is claimed is:

1. An underground mine energy management system, comprising:
   one or more electric mining vehicles;
   one or more energy storage devices;
   one or more charging stations configured for charging the energy storage devices, wherein each of the one or more energy storage devices is configured to be universally and interchangeably installed on and removed from an associated electric mining vehicle of the one or more electric mining vehicles, and one or more of charged at one of the one or more charging stations or installed on a different electric mining vehicle;
   a plurality of wireless nodes located at different 3D coordinate positions along travel paths throughout an underground mine, wherein energy zones are defined between respective pairs of the plurality of wireless nodes, wherein each energy zone corresponds to a tunnel of the underground mine; and
   one or more controllers communicatively coupled with a central control office and each of the electric mining vehicles, the energy storage devices, and the charging stations, wherein the one or more controllers are programmed to:
      receive data indicative of an energy utilization profile for each of the electric mining vehicles traversing each of the energy zones based on a zone-specific energy utilization efficiency of each respective electric mining vehicle as it travels in one of a loaded or unloaded condition through the energy zone, wherein the zone-specific energy utilization efficiency is based on a terrain of the tunnel and whether the electric mining vehicle is loaded or unloaded,
      receive data indicative of an energy storage profile for each of the energy storage devices available to be installed on an associated electric mining vehicle traversing each of the energy zones based on sensed battery characteristic data including one or more of a State of Charge (SOC), State of Health (SOH), number of completed charge cycles, or cell temperatures for the energy storage device,
      determine missions and prioritized tasks to be performed by each of the electric mining vehicles and each of the energy storage devices separately from the electric mining vehicles during a predetermined period of time,
      pair each electric mining vehicle with at least one energy storage device based on a determined mission or prioritized task, the energy utilization profile for the electric mining vehicle for energy zones associated with the determined mission or prioritized task, and the energy storage profile for the at least one energy storage device, and
      generate travel paths made up of a sequence of the energy zones for the paired electric mining vehicles and energy storage devices to complete the determined missions and prioritized tasks.

2. The underground mine energy management system of claim 1, wherein the one or more controllers are further programmed to:
   initially receive the data indicative of the energy utilization profile for each of the electric mining vehicles from one or more of historical data stored in a database, data calculated using physics-based equations, or empirically derived data; and then continually update the energy utilization profile in real time for the vehicle based on sensed performance data measured on the vehicle as the vehicle traverses each of the energy zones.

3. The underground mine energy management system of claim 1, wherein the one or more controllers are further programmed to:

initially receive the data indicative of the energy storage profile for each of the energy storage devices from one or more of historical data stored in a database, data calculated using physics-based equations, or empirically derived data; and then continually update the energy storage profile in real time for the energy storage device based on sensed battery characteristic data measured on the energy storage device mounted on an associated electric mining vehicle traversing each of the energy zones.

4. The underground mine energy management system of claim 1, wherein the one or more controllers are further programmed to:

receive data indicative of an energy charging capability for each of the one or more charging stations based on measured discharge limits, connection status, and location for each charging station.

5. The underground mine energy management system of claim 4, wherein the one or more controllers are further programmed to:

generate a travel path made up of a sequence of energy zones that put less of a demand on the energy storage devices when a charging station is not available along the travel path.

6. The underground mine energy management system of claim 4, wherein the one or more controllers are further programmed to:

consider environmental factors present in the sequence of energy zones making up a generated travel path when determining whether to pair a particular energy storage device with a particular electric mining vehicle for completing a determined mission or prioritized task.

7. The underground mine energy management system of claim 5, wherein the one or more controllers are further programmed to determine that a particular energy storage device is not suitable to be paired with a particular electric mining vehicle when the energy storage profile of the energy storage device indicates that the SOH of the energy storage device is too low for temperatures present in energy zones below a predetermined depth in the underground mine.

8. The underground mine energy management system of claim 1, wherein the one or more controllers are further programmed to:

first determine what mission or prioritized task is to be performed; and then determine which of the one or more electric mining vehicles, which of the one or more energy storage devices, and which of the one or more charging stations is suitable for completing the determined mission or prioritized task within a desired run time to meet productivity goals set for the underground mine during the predetermined period of time.

9. The underground mine energy management system of claim 8, wherein the one or more controllers are further programmed to:

determine that a prioritized task takes priority over productivity goals when the prioritized task includes one or more of clearing mined material from an area of the underground mine being developed, moving vehicles from a congested area of the mine, or taking advantage of the availability of a loading tool at a location in the mine where mined material is being pulled.

10. A controller for an underground mine energy management system that includes a plurality of wireless nodes located at different 3D coordinate positions along travel paths throughout an underground mine, wherein energy zones are defined between respective pairs of the plurality of wireless nodes, the controller comprising:

a memory storing instructions; and a processor operatively connected to the memory, the processor configured to execute the instructions to:

communicate with a central control office for the underground mine and each of a plurality of electric mining vehicles, a plurality of energy storage devices configured to be universally and interchangeably installed on and removed from an associated electric mining vehicle of the plurality of electric mining vehicles, and a plurality of charging stations, all operating within the underground mine, wherein the energy storage devices are configured to be one or more of charged at one of the charging stations or installed on a different electric mining vehicle, depending on mine productivity goals or specific missions or prioritized tasks to be performed in the underground mine, wherein each energy zone corresponds to a tunnel of the underground mine;

receive data indicative of an energy utilization profile for each of the electric mining vehicles traversing each of the energy zones based on a zone-specific energy utilization efficiency of each respective electric mining vehicle as it travels in one of a loaded or unloaded condition along the energy zone, wherein the zone-specific energy utilization efficiency is based on a terrain of the tunnel and whether the electric mining vehicle is loaded or unloaded;

receive data indicative of an energy storage profile for each of the energy storage devices available to be installed on an associated electric mining vehicle traversing each of the energy zones based on sensed battery characteristic data including one or more of a State of Charge (SOC), State of Health (SOH), number of charge cycles, or cell temperatures for the energy storage device;

determine missions and prioritized tasks to be performed by each of the electric mining vehicles and each of the energy storage devices separately from the electric mining vehicles during a predetermined period of time;

pair each electric mining vehicle with at least one energy storage device based on a determined mission or prioritized task, the energy utilization profile for the electric mining vehicle for energy zones associated with the determined mission or prioritized task, and the energy storage profile for the at least one energy storage device; and generate travel paths made up of a sequence of the energy zones for the paired electric mining vehicles and energy storage devices to complete the determined missions and prioritized tasks.

11. The controller of claim 10, wherein the controller is further programmed to:

initially receive the data indicative of the energy utilization profile for each of the electric mining vehicles from historical data stored in a database; and then continually update the energy utilization profile in real time for the vehicle based on sensed performance data measured on the vehicle as the vehicle traverses each of the energy zones.

12. The controller of claim 10, wherein the controller is further programmed to:

initially receive the data indicative of the energy storage profile for each of the energy storage devices from historical data stored in a database; and then continually update the energy storage profile in real time for the energy storage device based on sensed battery characteristic data measured on the energy storage device mounted on an associated electric mining vehicle traversing each of the energy zones.

13. The controller of claim 10, wherein the controller is further programmed to:

receive data indicative of an energy charging capability for each of the charging stations based on measured discharge limits, connection status, and location for each charging station.

14. The controller of claim 13, wherein the controller is further programmed to:

generate a travel path made up of a sequence of energy zones that put less of a demand on the energy storage devices when a charging station is not available along the travel path.

15. The controller of claim 13, wherein the controller is further programmed to:

consider environmental factors present in the sequence of energy zones making up a generated travel path when determining whether to pair a particular energy storage device with a particular electric mining vehicle for completing a determined mission or prioritized task.

16. The controller of claim 14, wherein the controller is further programmed to:

determine that a particular energy storage device is not suitable to be paired with a particular electric mining vehicle when the energy storage profile of the energy storage device indicates that the SOH of the energy storage device is too low for temperatures present in energy zones below a predetermined depth in the underground mine.

17. The controller of claim 10, wherein the controller is further programmed to:

first determine what mission or prioritized task is to be performed, and then determine which of the electric mining vehicles, which of the energy storage devices, and which of the charging stations is suitable for completing the determined mission or prioritized task within a desired run time to meet productivity goals set for the mine during the predetermined period of time.

18. The controller of claim 17, wherein the controller is further programmed to:

determine that a prioritized task takes priority over productivity goals when the prioritized task includes one or more of clearing mined material from an area of the underground mine being developed, moving vehicles from a congested area of the mine, or taking advantage of the availability of a loading tool at a location in the mine where mined material is being pulled.

19. A method of managing energy consumption in an underground mine that includes a plurality of wireless nodes located at different 3D coordinate positions along travel paths throughout the underground mine, wherein energy zones are defined between respective pairs of the plurality of wireless nodes, the method including:

communicating, using one or more controllers, with a central control office for the mine and each of a plurality of electric mining vehicles, a plurality of energy storage devices configured to be universally and interchangeably installed on and removed from an associated electric mining vehicle, and a plurality of charging stations, all operating within the underground mine, wherein the energy storage devices are configured to be one or more of charged at one of the charging stations or installed on a different electric mining vehicle, depending on mine productivity goals or specific missions or prioritized tasks to be performed in the underground mine;

receiving, by the one or more controllers, data indicative of an energy utilization profile for each of the electric mining vehicles traversing each of the energy zones based on a zone-specific energy utilization efficiency of each respective electric mining vehicle as it travels in one of a loaded or unloaded condition along the energy zone, wherein each energy zone corresponds to a tunnel of the underground mine, and wherein the zone-specific energy utilization efficiency is based on a terrain of the tunnel and whether the electric mining vehicle is loaded or unloaded;

receiving, by the one or more controllers, data indicative of an energy storage profile for each of the energy storage devices available to be installed on an associated electric mining vehicle traversing each of the energy zones based on sensed battery characteristic data including one or more of a State of Charge (SOC), State of Health (SOH), number of charge cycles, or cell temperatures for the energy storage device;

determining, using the one or more controllers, missions and prioritized tasks to be performed by each of the electric mining vehicles and each of the energy storage devices separately from the electric mining vehicles during a predetermined period of time;

pairing, using the one or more controllers, each electric mining vehicle with at least one energy storage device based on a determined mission or prioritized task, the energy utilization profile for the electric mining vehicle for energy zones associated with the determined mission or prioritized task, and the energy storage profile for the energy storage device; and generating, using the one or more controllers, travel paths made up of a sequence of the energy zones for the paired electric mining vehicles and energy storage devices to complete the determined missions and prioritized tasks.

20. The method according to claim 19, further including:

determining what mission or prioritized task is to be performed; and then determining which of the electric mining vehicles, which of the energy storage devices, and which of the charging stations is suitable for completing the determined mission or prioritized task within a desired run time.

* * * * *